United States Patent [19]

Roden et al.

[11] Patent Number: 5,497,466
[45] Date of Patent: Mar. 5, 1996

[54] UNIVERSAL ADDRESS GENERATOR

[75] Inventors: Philip Roden, Plano; Brian T. Deng, Richardson, both of Tex.; William Saperstein, San Carlos, Calif.

[73] Assignee: Texas Instruments Inc., Dallas, Tex.

[21] Appl. No.: 210,093

[22] Filed: Mar. 17, 1994

Related U.S. Application Data

[63] Continuation of Ser. No. 915,150, Jul. 17, 1992, abandoned.

[51] Int. Cl.$^6$ .............................. G06F 13/00; G06F 12/00
[52] U.S. Cl. ............................................ 395/306; 395/310
[58] Field of Search .................................... 395/325, 275, 395/400, 425, 306, 308, 309, 310, 402, 403, 823, 824

[56] References Cited

U.S. PATENT DOCUMENTS 4,821,185  4/1989  Esposito .................................. 395/275
5,185,878  2/1993  Baror et al. ............................. 395/425
5,255,374  10/1993  Aldereguia et al. .................... 395/325

Primary Examiner—Glenn A. Auve
Attorney, Agent, or Firm—Rose Alyssa Keagy; Richard L. Donaldson

[57] ABSTRACT

A bus interface system includes a processor unit 10 a local bus 11 coupled to the processor unit and interface circuitry 12 coupled to the local bus 11 for providing continuous generation of addresses on the local bus 11 or on a system bus 15. The local bus 11 may be a processor bus on a computer board while the system bus 15 may be an architectural bus standard such as Futurebus+. The interface circuitry 12 includes a universal address generator 14 that provides proper address generation on both system bus 15 and local bus 11. Also a method of generating addresses includes loading an address into an address register, saving the address if it is the first address, outputting the address to a local or system bus, incrementing the address, and repeating sequence at the loading step.

11 Claims, 3 Drawing Sheets

UNIVERSAL ADDRESS GENERATOR

This application is a Continuation of application Ser. No. 07/915,150 filed Jul. 17, 1992, now abandoned.

FIELD OF THE INVENTION

This invention generally relates computers and more specifically to bus system interface circuitry and methods.

BACKGROUND

Futurebus+ is an IEEE specification for backplane-based computing that permits architectural consistency across a broad range of computer products. Key attributes of Futurebus+ are discussed in the article of J. Theus appearing in *Microprocessor Report*, Volume 6, Number 7, May 27, 1992. Futurebus+ is a comprehensive architectural specification designed as an open standard; that is, an interface standard for which there are no preconceived restrictions in terms of architecture, microprocessor, and software implementations. It is also designed to support multiple generations of computer technology, leading to system speeds significantly greater than current systems.

Futurebus+ provides a 64-bit architecture with a compatible 32-bit subset and data path extensions to 128 or 256 bits. The protocols, while providing headroom for system growth, explicitly support real-time scheduling, fault tolerance, and high-availability and high-reliability systems.

The logical layering of the Futurebus+ specifications offers a wealth of architectural features with which designers may implement a wide variety of systems. Both loosely coupled and tightly coupled compute paradigms are supported via the parallel protocols and in the message-passing and cache-coherence protocols. The control and status registers provide a standard software interface to the Futurebus+, easing the development and transportability of I/O drivers and other system software.

Unlike older standard buses, Futurebus+ is optimized for a backplane environment. Backplane transceiver logic (BTL) circuits provide incident-wave switching capability (thus no stop and hold times), low capacitance with high current drive capability, and controlled one-volt voltage swings for fast switching.

Interface circuits connect local buses to system buses such as Futurebus+. New interface circuits are needed to connect local buses to backplane buses like Futurebus+. It is accordingly an object of the invention to provide a bus interface circuit for connecting a local bus to a standard system bus architecture. It is also an object of the invention to provide a method of connecting a backplane system bus to a local bus.

There are many advantages of the invention. First, the universal address generator is compatible with dual bus architecture. Additionally, the circuit can be implemented in standard cell technology, providing system design time reduction, program risk reduction, a greater degree of integration, greater specification complexity, and joint development opportunities.

Other objects and advantages of the invention will become apparent to those of ordinary skill in the art having reference to the following specification together with the drawings herein.

SUMMARY

An address generator providing continuous generation of proper addresses on a local bus or on a system bus is included within a bus interface circuit. The bus interface circuit is coupled between a local bus and a system bus. Preferably the address generation circuitry comprises means for loading an address register, means for saving the first address loaded, means for incrementing said address, and means for saving said incremented address. The address register is loaded from a cache tag register, the system bus, the local bus, or the incremented address. Preferably the system bus is a Futurebus+.

This is also a method of generating addresses comprising loading address into an address register, saving the address if it is the first address, outputting the address to a local or system bus, incrementing the address, and repeating sequence at the loading step.

Preferably, the method also includes determining whether to load the address from the cache tag, the local address bus, the system address bus, or the incremented address; and determining the size of the increment. Also, the system bus is preferably a Futurebus+.

DETAILED DESCRIPTION OF THE PREFERRED EMBODIMENT

Figure 1:
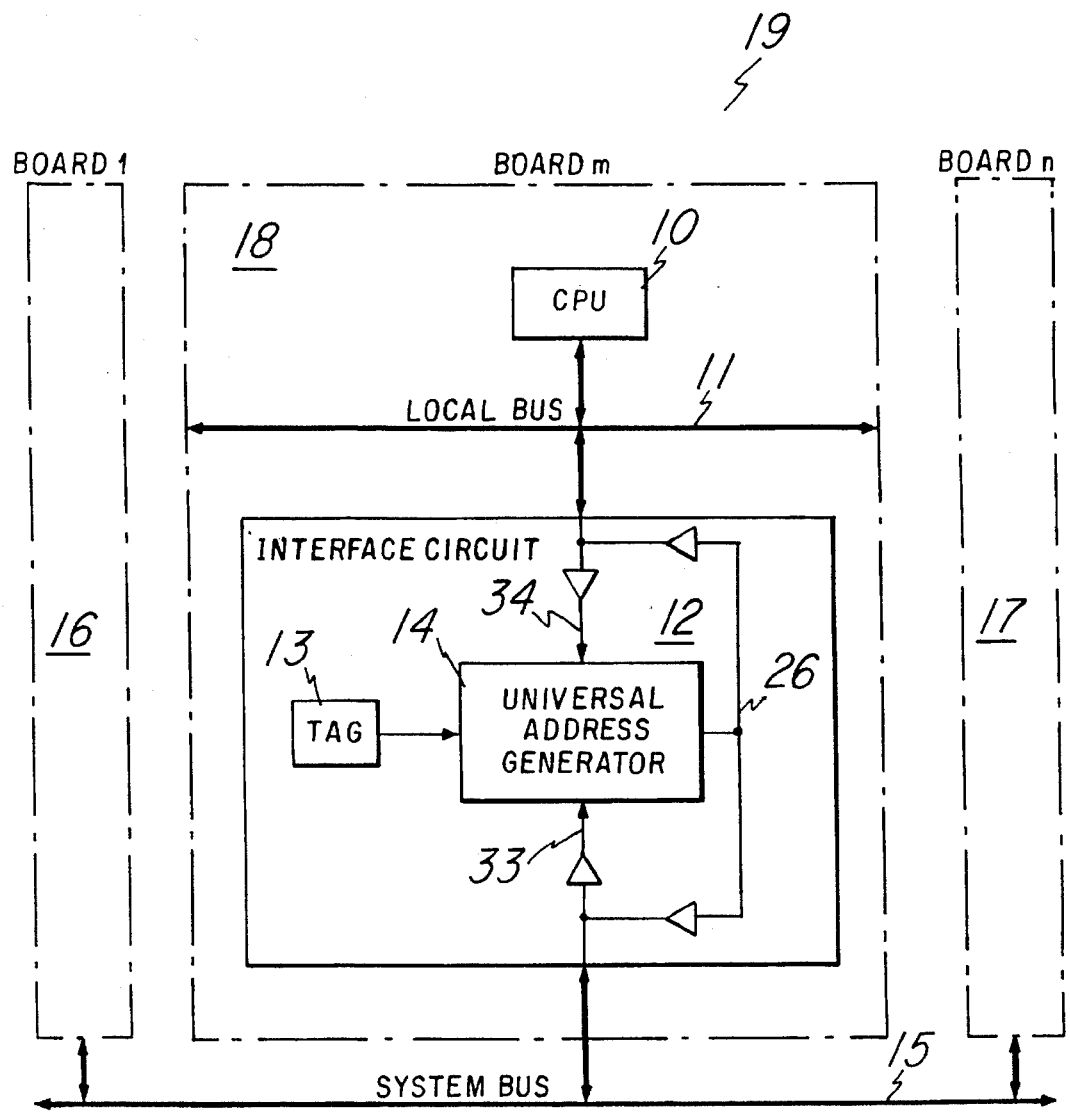
FIG. 1 is a block diagram of a bus interface circuit.

FIG. 1 is a block level diagram illustrating a computer system 19 within which the preferred embodiment of the invention operates. The computer system 19 includes a plurality of computer boards such as 16, 17, 18 . . . n connected to a system bus, 15. System bus 15 is preferably Futurebus+. The computer boards 16 . . . n may have a plurality of memory chips and/or peripheral (I/O) chips on them. The plurality of memory chips and I/O chips may communicate with one another via the system bus 15. Board 18 may be a high-end computer board, performing a function such as, for example, regulating a flow system for the Space Shuttle. Board 18 may contain a microprocessor, 10, and an interface circuit, 12 coupled to local bus, 11. The interface circuit, 12, is also coupled to system bus, 15. Microprocessor 10, for example may comprise a Intel 486, or a Motorola 68040; while local bus 11, may comprise an Intel 486 bus or a Motorola 68040 bus. Interface circuit 12, may comprise common electrical components which together function as a bus interface bridge between a local bus and system bus as known to those skilled in the art. This interface circuitry has been significantly improved by the addition of Universal Address Generator 14 and a Cache Tag Register 13. To maintain the addresses between local buss 11 and system bus 15, interface circuit 12 incorporates the inventive Universal Address Generator, 14.

Interface circuitry 12 contains the control logic necessary to translate Futurebus+ transactions into local bus transactions and vice versa. It interfaces easily to the buses that service a variety of microprocessors such as R4000, 680X0, 88XXX and 80X86. Additionally, interface circuitry 12 provides the parallel-protocol support that is required to be in compliance with Futurebus+ standard. Interface circuity 12 performs the transactions required to service the local bus or Futurebus+. It provides information such as the location to which the data is to be routed along with the correct protocol and information (packet or compelled, address, data, or disconnect data).

Figure 2:
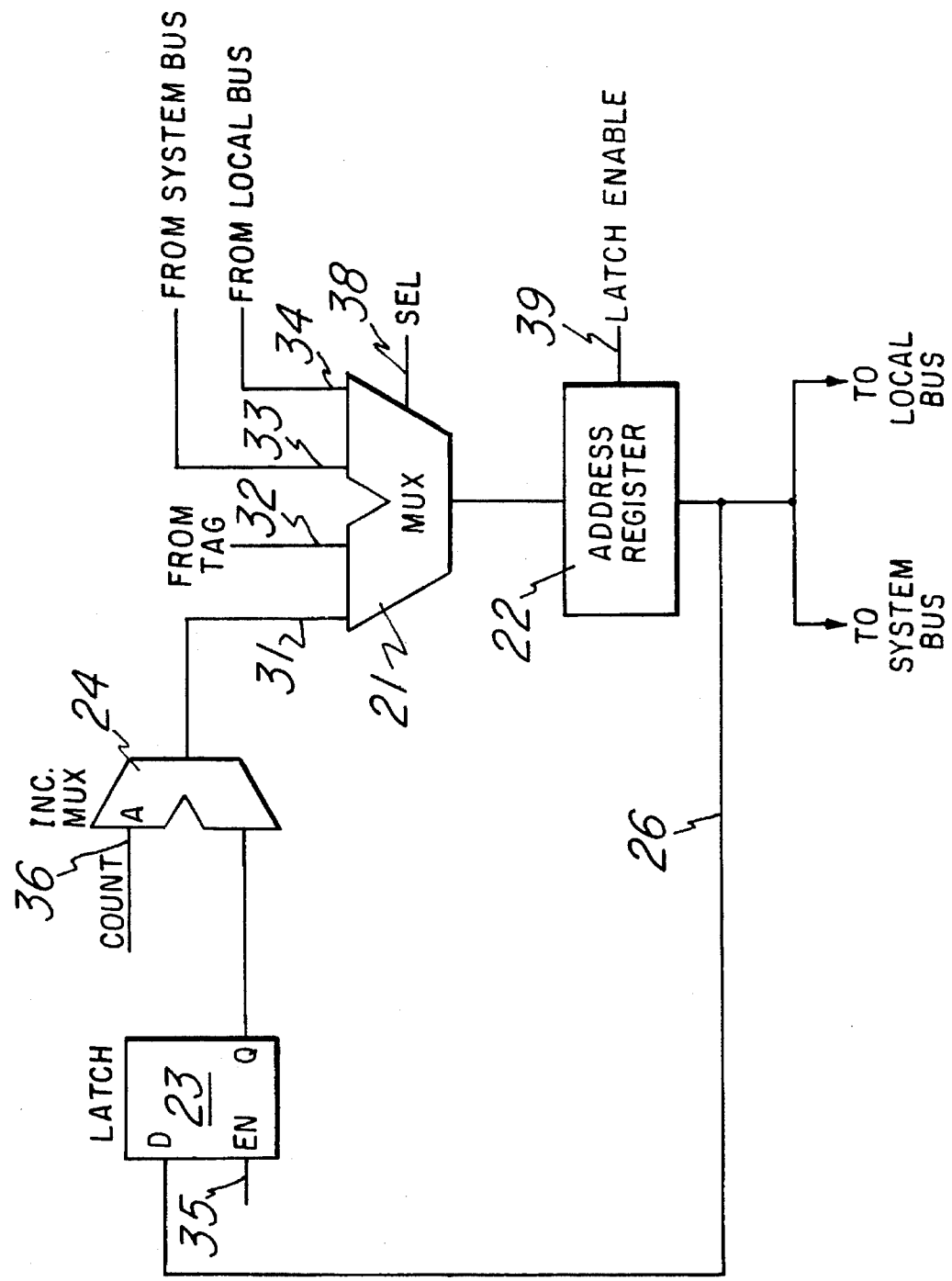
FIG. 2 is a logic diagram of the universal address generator shown in FIG. 1.

FIG. 2 is a representative circuit diagram of a preferred embodiment of the Universal Address Generator 14 of FIG. 1. A the Universal Address Generator Multiplexor, 21, has four inputs: an incremented address signal 31 from an Increment Multiplexor 24, a cache tag signal 32 from Cache Tag 13, a system address bus signal 33 from bus 15, and a local bus signal 34 from bus 11. The output of Multiplexor 21 is coupled to an Address Register, 22, while the output of Address register 22 is part of the bus 26 which interfaces to both the system bus 15 and the local bus 11. Save Latch 23 receives as inputs, the output of Address Register 22 and an Enable signal 35. It's output goes to Increment Multiplexor 24. Increment Multiplexor 24 also receives a Count signal input 36. The output of Increment Multiplexor 24 is coupled to the Multiplexor 21.

As will be explained in more detail below, Universal Address Generator 14 1) knows where to send the address, 2) keeps a consistent address 3) keeps the address updated and 4) knows how much to increment the address.

Additionally, Universal Address Generator 14 provides continuous generation of proper addresses on two buses for disjoint transactions, partial transactions, aligning critical word, and sequential transactions with programmable data lengths, data widths, and address widths.

Figure 3:
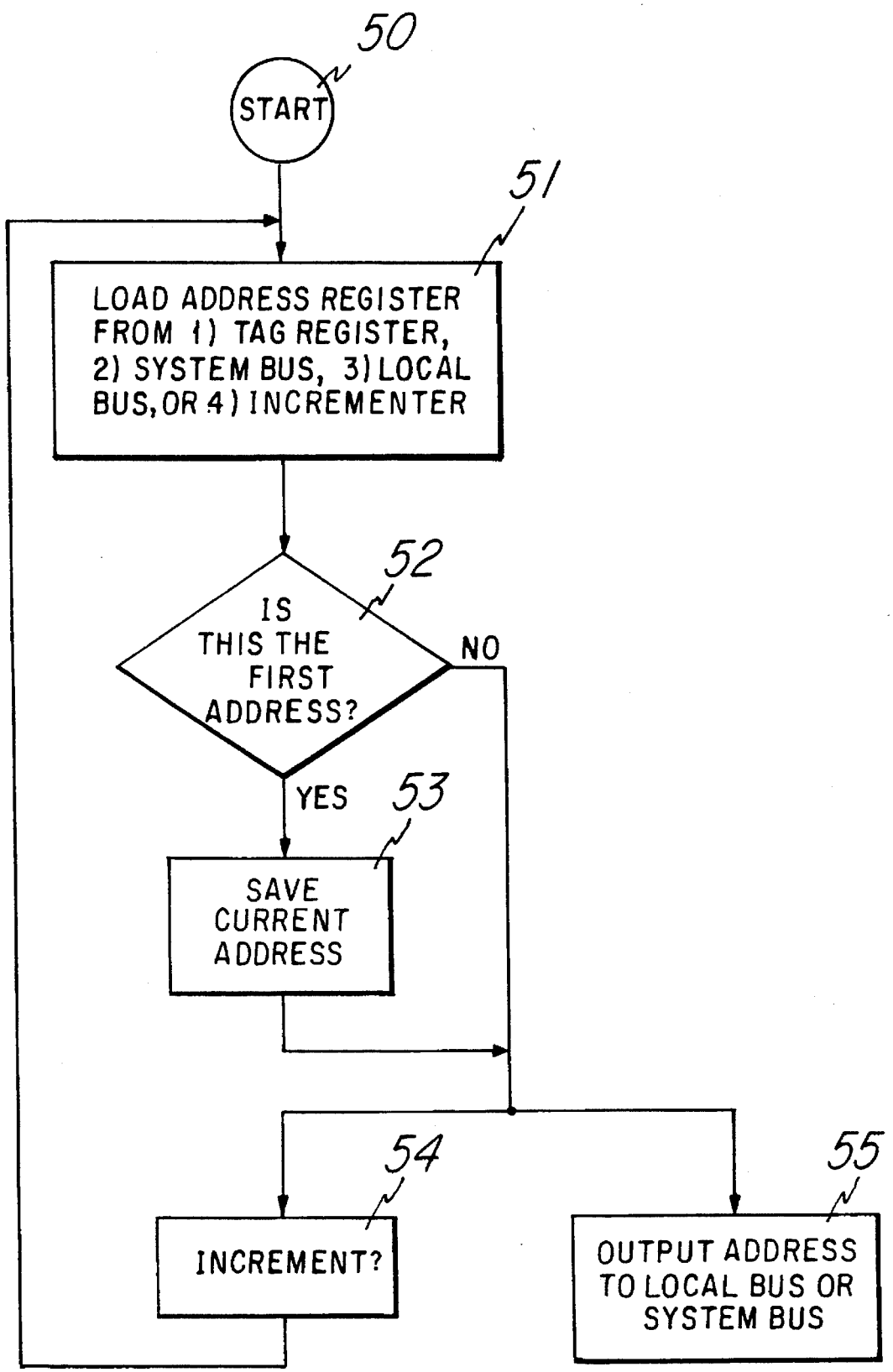
FIG. 3 is a flow chart depicting a set of steps which may be used by an address generator of FIG. 2 in accordance with the present invention.

FIG. 3 is a flow diagram illustrating the functional steps followed by the invention. Referring to FIG. 3, a first step 51 is loading the Address Register 22 from one of four locations: 1) Cache Tag Registers 13 2) System Bus 15 via Bus 33 3) Local Bus 11 via Bus 34, or 4) Incrementer circuitry 24. The location selection is based on the signal input on Select line 38. For example, if the Select signal on line 38 indicates that a transaction originates from the system bus, Multiplexor 21 will choose as its input the address from the System Bus input 33. Therefore, signal 38 tells Multiplexor 21 which signal to load. A signal on Latch Enable 39 tells the Address Register when to latch the address.

In step 52 of FIG. 3 a signal on Enable 35 determines if the address output of Address Register 22 is saved in the Save Latch 23. Save Latch 23 saves the starting address. When a new address is needed, Multiplexor 24 takes the starting address from Latch 23 and the Count 36 input to generate a new address. Step 52 occurs after the original address is stored. Thus, the original address is loaded in the save register at the beginning of an address transaction in step 53. In transactions that require multiple addresses, the original address is loaded in the address register and also in the Save Latch 23. When the transaction begins, on either bus, the Count (36) is updated and added to the save value. When the transaction is finished the new address is loaded in the address register 22 via the Multiplexor 21 input 31.

After the address save of Step 53, the Address Register outputs its address on Bus 26 to be used by System Bus 15 or Local Bus 11. Simultaneous with Step 55, a decision is made whether to increment the saved address, this is step 54. In step 54 the signal on Count 36 determines how much to increment the address in Save Latch 23 for the next transaction. Therefore the value in count 36 is simply added to the address output form Save Latch 23. The decision whether to increment and by how much is based on such things as which bus the transaction is master for, whether it is a read or a write and the data length. This information is fed from line 36, Count received from internal memory and data pointers.

In the preferred embodiment there is always an address increment. The decisions made by the Universal Address Generator circuitry 14 are how much to increment by (determined by Count 36).

The advantage of Steps 54 and 55 occurring simultaneously is faster back-to-back transaction time. For example, if the output of Step 55 is fed to a slave that decides it must break up a large block transfer into several small transfers with different addresses, by the time the current transaction is finished, the increment has already been performed and is ready to be loaded into the address Register 22 for the next transaction in a multiple transaction set and proceed once again through Step 22.

Therefore the increment is performed simultaneous to when the current address is out on the bus. The advantage is that when one transaction is going on with one address, that same address is latched into the save 23 and then incremented and held until the current transaction is complete. When Select 38 is activated the output of Increment Multiplexor 24 feeds the new address into the Address Register, 22 and the method begins again at step 51.

The Universal Address Generator 14 maintains the address between two buses 11 and 15. The transactions for the buses can contain multiple pieces of data and can be totally disjoint. For instance, the Local Bus 11 might be doing a critical word first operation while the System Bus 15 does a block transfer. Therefore different addresses can be sent to the local bus 11 while one address for the block is sent to the system bus 15. In another situation, a single transfer can be done on one bus requiring a separate address for each transfer and it can be converted to a block transfer on another bus and vice versa. Another possibility is a block transfer to a block transfer of different sizes.

The local bus 11 is capable of performing a single transfer, block transfer, or a block critical word first transfer or a multiple block, while the system bus can simultaneously perform a single, block, or multiple block transfer.

An advantage of the Universal Address Generator 14 is that it is capable of handling many transaction modes on the Local and System Bus. Some of the transaction modes the Universal Address Generator handles are End of Data Transactions, 64 Bit Partials, Critical Word First, Multiple Block and Cache Copy Back as described below.

The End of Data transaction occurs when a block transfer is split up into multiple data pieces with multiple addresses. In this situation the Universal Address Generator 14 is located on Board 18 acting as a System Bus master when a slave board (for instance Board 16) has run out of data. The slave Board 16 tells master Board 18 that it has hit End of Data. Then the Master board 18 must first increment the address from where the slave stopped and then find a new slave board (possibly board 17) to continue the block transfer in order to finish data transfer in the intended address range.

Another possible transaction situation is Critical Word First (CWF) which is a block read on the Local Bus 11. As an example, Interface Circuitry 12 is a System Bus 15 master and a Local Bus 11 slave. The Universal Address Generator 14 is a gateway between the System Bus 15 and the Local Bus 11. In a CWF operation there is an address transformation. For example, Local Bus 11 will request data in the following order: Data #3, Data #4, Data #1, Data #2. This transformation order on the local bus 11 is determined by the interface circuitry 12. Local Bus 11 really wants Data #3 as the current instruction to be executed but will usually request the whole block of data for storage as instruction cache for later access in order to increase overall throughput. This order is prohibited on the System Bus 15. On System Bus 15 the data order is: Data #1, Data #2, Data #3, Data #4.

Unlike a CWF operation, a single transaction will have no address transformation. A single address will be loaded from one bus and outputted to the other bus.

In a multiple block transaction, Interface circuitry 12 is usually a slave on System bus and master on the Local Bus. The format requires the address to be incremented after every block.

For Cache Copyback the complete address is stored in the Cache Tag Register, 13. Board 18 is a system bus master and cannot be a slave anyplace. In this mode, the data in Cache tag Register 18 is directly output onto the System Bus 15.

FIG. 2 does not necessarily represent the mechanical structural arrangement of the exemplary system because the Universal Address Generator is preferably generated in Verilog as shown in TABLES 1–7. FIG. 2 is primarily intended to illustrate the major structural components of the system in a convenient format, whereby the present invention may be more readily understood.

While in accordance with the provisions and statutes there has been illustrated and described the best form of the invention, certain changes may be made without departing from the spirit of the invention as set forth in a appended claims. Various modifications of the disclosed embodiment will become apparent to persons skilled in the art upon reference to the description of the invention. It is therefore contemplated that the appended claims will cover any such modifications or embodiments as fall within the true scope of the invention.

TABLE 1

MODULE DEFINITION module add_gen
(
//Inputs - from internal blocks
    global_sel,      // Hbus/Fbus cache data
    h_slv_addr,      // Hbus block transfer
    \addr36_en* ,    // Hbus 36 bit address mode
    hbaddr ,         // Hbus incoming address
    lb_ptr,          // Hbus FIFO/Store Cache pointer
    byte ,           // Hbus partial information
    sec_wrd,         // Hbus second word of a two word partial
    tag ,            // Cache tag address
    \sel_en* ,       // Fbus selected slave
    fb_master,       // Fbus master indicator
    fbaddr ,         // Fbus incoming address
    fb_ptr ,         // FIFO read pointer
    wr_ptr ,         // FIFO write pointer
    partial_1,       // Fbus x-fer was a partial transaction
    fbwidth64_1,     // Fbus x_fer was a 64 bit data width
//Inputs - from I/O pads
    \fb_grant_i* ,   // load addreg from Hbus
    \new_addr_i* ,   // incrment addreg
    dma_mode_i,      // Hbus no critical word first indicator
    dlength_i ,      // Hbus data length
    h_mode_i,        // Hbus mode of operation
    \dpu_rd* ,       // Fbus Fifo direction
    \reset* ,        // reset signal
//Outputs
    address ,        // FBus address
    b_a_o            // Hbus address
);

TABLE 2

PORT DECLARATIONS input
    global_sel, h_slv_addr, \addr36_en* , \sel_en* ,
    fb_master, \fb_grant_i* , \new_addr_i* , sec_wrd,
    dma_mode_i, \dpu_rd* , \reset* , partial_1, fbwidth64_1 ;
input [1:0]
    dlength_i ;
input [2:0]
    h_mode_i;
input [3:0]
    byte;
input [6:0]
    lb_ptr, fb_ptr, wr_ptr ;
input [29:0]
    tag ;
input [35:0]
    hbaddr, fbaddr ;
output [35:0]
    address , b_a_o ;

TABLE 3

NET ASSIGNMENTS AND DECLARATION wire [35:0]
    nxt_addr, addr_sav, inc_add, addreg ;
wire [6:0]
    count;
wire [3:0]
    loaddr;
wire [2:0]
    loaddr_sel ;
wire [1:0]
    addreg_sel;
// *** Define latch elements
        lch_rs # (36)
//              * transaction address latch
            adreg ({{nxt_addr[35:32] & {4{~\addr36_en* }}},
                            nxt_addr[31:0]},
                            addreg,\reset* ,1'b1,\addreg_en* ) ;
        lch # (36)
            ad_sav(addreg[35:0],addr_sav,\addr_sav_en* ) ;

TABLE 4

GATE AND STRUCTURAL DECLARATIONS

// *** h_mode decoder
//      h-mode [2:0]   = 100       sc <–> hbus (block)
//                     = 000       sc <–> hbus (compelled)
//                     = 001       fifo <–> hbus (compelled)
//                                     if lcl_csr = 1 then hbus <–> csr
//                                     if dpu_csr = 1,lcl_csr=0 csr –> fifo
//                     = 101       fifo <–> hbus (block)
//                     = 110       sc –> fifo (block)
//                     = 111       fifo –> sc (block)
//                     = 011       hbus invalidate
//                     = 010       fifo –> csr (compelled)
//                                     if dpu_csr = 1 fifo –> csr
// *** Define low address bit zero enable
        assign
                    loaddr_sel = addr_sel_enc(global_sel,h_slv_addr,dma_mode_i,
                                    dlength_i) ;

TABLE 4-continued

GATE AND STRUCTURAL DECLARATIONS

```
//      loaddr[3:0] = addreg[5:2] for non-fb cache line trans.
//      loaddr[3:0] = 4'b0 for fbus+ cache line
        assign
                loaddr = lo_addr_algn(loaddr_sel,addreg[5:2]) ;
        assign
                address [35:0] = {addreg[35:6],loaddr,2'b0} ;
        assign
                b_a_o = {addreg[31:3],byte_addr(byte,partial_1,fbwidth64_1,
                                sec_wrd,addreg[2]),addreg[35:32]};
// *** Define address register enable line and input mux
//      addreg_sel     = 01 -> fbaddr
//                     = 00 -> hbaddr
//                     = 10 -> inc_addr
//                     = 11 -> tag
        assign
                addreg_sel = addrsel_dec(\sel_en* ,\fb_grant_i* ,
                                \new_addr_i* ,h_mode_i ) ,
                \addreg_en* = &{ \fb_grant_i* ,
                                \sel_en* , \new_addr_i* } ,
                \addr_sav_en* = &{\fb_grant_i* ,\sel_en* } ;
// *** Define address register mux
//      nxt_addr =      hbaddr for addreg_sel = 2'b00
//                      fbaddr for addreg_sel = 2'b01
//                      inc_add for addreg_sel = 2'b10
//                      tag for addreg_sel = 2'b11
        assign
                nxt_addr = mux4_36 ({hbaddr[3:0],hbaddr[35:4]},
                                fbaddr,inc_add,{tag,6'b0},
                                addreg_sel) ;
// *** Define incrementor input count for addreg
//      when h_mode_i = invalidate -> count = hbus burst datalength
//      else count = compelled mode datawidth on fbus
//      The addreg is updated with fb_ptr fbwidth64 during
//      each transaction. In this way, if an ED occurs, the
//      addreg has the address of the starting address
        assign
                count = cnt_mux(h_mode_i,fb_master,\dpu_rd* ,
                                dlength_i,fb_ptr[5:0],
                                wr_ptr[5:0],lb_ptr) ;
// *** Define address incrementor for "end of data" disconnects
        assign
                inc_add = addr_sav + { 27'b0 , count ,2'b0} ;
```

TABLE 5

FUNCTION DEFINITIONS

```
function [1:0] addrsel_dec ;
    input \sel_en* ,\fb_grant_i* ,\new_addr_i* ;
    input [2:0] h_mode_i ;
    begin
        casez ({\sel_en* ,\fb_grant_i* ,\new_addr_i* ,
                &{h_mode_i[2],h_mode_i[1],~h_mode_i[0]} })
            4'b011? : addrsel_dec = 2'b01 ;
            4'b1010 : addrsel_dec = 2'b00 ;
            4'b1100 : addrsel_dec = 2'b10 ;
            4'b1011,
            4'b1111 : addrsel_dec = 2'b11 ;
            default   addrsel_dec = 2'b01 ;
        endcase
    end
endfunction
function [6:0] cnt_mux ;
    input [2:0] h_mode_i ;
    input fb_master,\dpu_rd* ;
    input [1:0] dlength_i ;
    input [5:0] fb_ptr ;
    input [5:0] wr_ptr ;
    input [6:0] lb_ptr ;
    begin
        casez ({h_mode_i,fb_master,\dpu_rd* })
            5'b0110? : cnt_mux = dlength_dec(dlength_i) ;
            5'b0010?,
            5'b1010? : cnt_mux = lb_ptr ;
```

TABLE 5-continued

FUNCTION DEFINITIONS

```
            5'b???10 : cnt_mux = {1'b0,wr_ptr} ;
            5'b???11 : cnt_mux = {1'b0,fb_ptr} ;
            default  cnt_mux = {1'b0,fb_ptr} ;
        endcase
    end
endfunction
function [6:0] dlength_dec ;
    input [1:0] dlength_i ;
    begin
        case (dlength_i)
            2'b11 : dlength_dec = 7'h02 ;
            2'b10 : dlength_dec = 7'h04 ;
            2'b01 : dlength_dec = 7'h08 ;
            2'b00 : dlength_dec = 7'h10 ;
        endcase
    end
endfunction
function [2:0] addr_sel_enc ;
    input global_sel, h_slv_addr ,dma_mode_i ;
    input [1:0] dlength_i ;
    begin
        casez ({global_sel,h_slv_addr,dma_mode_i,dlength_i})
            5'b1_?_?_??,
            5'b0_1_0_00 : addr_sel_enc = 3'b000 ;
            5'b0_1_0_01 : addr_sel_enc = 3'b001 ;
            5'b0_1_0_10 : addr_sel_enc = 3'b010 ;
            5'b0_1_0_11 : addr_sel_enc = 3'b011 ;
```

TABLE 5-continued
FUNCTION DEFINITIONS

```
        5'b0_1_1_?? : addr_sel_enc = 3'b100 ;
        default addr_sel_enc = 3'b100 ;
    endcase
end
endfunction
function [3:0] lo_addr_algn ;
    input [2:0] loaddr_sel ;
    input [3:0] addreg ;
    begin
        casez (loaddr_sel)
            3'b000 : lo_addr_algn = 4'b0 ;
            3'b001 : lo_addr_algn = {addreg[3],3'b0} ;
            3'b010 : lo_addr_algn = {addreg[3:2],2'b0} ;
            3'b011 : lo_addr_algn = {addreg[3:1],1'b0} ;
            3'b100 : lo_addr_algn = addreg ;
            default lo_addr_algn = addreg ;
        endcase
    end
endfunction
function [2:0] byte_addr ;
    input [3:0] byte ;
    input partial_1 , fbwidth64_1, sec_wrd ,addreg ;
    begin
        casez ({byte,partial_1,fbwidth64_1})
            6'b???011 : byte_addr = {sec_wrd,2'b00} ;
            6'b??0111 : byte_addr = {sec_wrd,2'b01} ;
            6'b?01111 : byte_addr = {sec_wrd,2'b10} ;
            6'b011111 : byte_addr = {sec_wrd,2'b11} ;
            6'b???010 : byte_addr = {addreg,2'b00} ;
            6'b??0110 : byte_addr = {addreg,2'b01} ;
            6'b?01110 : byte_addr = {addreg,2'b10} ;
            6'b011110 : byte_addr = {addreg,2'b11} ;
            6'b????0? : byte_addr = {addreg,2'b00} ;
            default     byte_addr = { addreg, 2'b00} ;
        endcase
    end
endfunction
function [35:0] mux4_36 ;
    input [35:0] in1, in2, in3, in4 ;
    input [1:0] mux_sel ;
    begin
        case (mux_sel)
            2'b00 : mux4_36 = in1 ;
            2'b01 : mux4_36 = in2 ;
            2'b10 : mux4_36 = in3 ;
            2'b11 : mux4_36 = in4 ;
            default mux4_36 = 36'bx ;
        endcase
    end
endfunction
```

TABLE 6
LIBRARY MODEL FOR LATCH WITH ENB

```
//***********************************************************
// Module Definition
//***********************************************************
module lch ( in,out, \en* ) ;
//***********************************************************
// Define Parameters {optional}
//***********************************************************
parameter width = 1 ,
          delay = 1 ;
//***********************************************************
// Port Declarations
//***********************************************************
    input [ width-1:0 ] in ;
    input \en* ;
    output [ width-1:0 ] out ;
//***********************************************************
// Net Assignments and Declarations
//***********************************************************
    reg [width-1:0] out ;
//***********************************************************
```

TABLE 6-continued
LIBRARY MODEL FOR LATCH WITH ENB

```
// Procedural Assignments
//***********************************************************
    always @ (\en* or in)
        begin
            if (\en* == 0)
                       #(delay) out = in ;
            else if (\en* == 1 || out == in)
                       #(delay) out = out ;
            else
                       #(delay) out = 'bx ;
        end
endmodule
```

TABLE 7
LIBRARY MODEL FOR LATCH WITH SET, RESET, AND ENAB

```
//***********************************************************
// Module Definition
//***********************************************************
module lch_rs ( in,out, \reset* ,\set* , \en* ) ;
//***********************************************************
// Define Parameters {optional}
//***********************************************************
parameter width = 1 ,
          delay = 1 ,
          ones = 64'hffffffff ;
//***********************************************************
// Port Declarations
//***********************************************************
    input [ width-1:0 ] in ;
    input \reset* , \set* , \en* ;
    output [ width-1:0 ] out ;
//***********************************************************
// Net Assignments and Declarations
//***********************************************************
    reg [width-1:0] out ;
//***********************************************************
// Procedural Assignments
//***********************************************************
    always @ (\reset* or \set* )
        begin
            if (\reset* == 1'b0 && \set* == 1'b1)
                assign out = 1'b0 ;
            else if (\set* == 1'b0 && \reset* == 1'b1)
                assign out = ones ;
            else if (\reset* == 1'b1 && \set* ==1'b1)
                deassign out ;
            else
                assign out = 'bx ;
        end
    always @ (\en* or in )
        begin
            if (\en* == 0)
                #(delay) out = in ;
            else if (\en* == 1 || out == in)
                #(delay) out = out ;
            else
                #(delay) out = 'bx ;
        end
endmodule
```

What is claimed is:

1. A bus interface system comprising:

a local bus having address leads carrying address signals;

a system bus having address leads carrying address signals;

a cache tag having address leads for carrying address signals;

address circuitry coupled to said local bus, said cache tag, and said system bus for providing selected address signals to said local bus and said system bus; and said address circuitry comprising:

address register circuitry coupled to said local bus, and said system bus for storing said address signals and for providing selected address signals to said local bus and said system bus;

saving circuitry coupled to said address register circuitry for saving address signals first loaded in said address register circuitry;

incrementing circuitry coupled to said saving circuitry for incrementing saved address signals received from said saving circuitry in accordance with a count input signal; said incrementing circuitry providing said incremented address signal to multiplexing circuitry; and said multiplexing circuitry coupled to and receiving address signals from said local bus, said system bus, said cache tag, and said incrementing circuitry; said multiplexing circuitry selectively loading said address signals into said address register circuitry in response to a select input signal.

2. The system of claim 1 wherein the saving circuitry for saving the address signal first loaded in said address register circuitry is a latch.

3. The system of claim 1 wherein the incrementing circuitry includes an incrementing multiplexor with a first and second input and an output, said first input coupled to said saving circuitry for receiving said address signals from said saving circuitry, said second input receiving a count signal, and said output coupled to said multiplexing circuitry for sending an incremented address signal to said multiplexing circuitry.

4. The system of claim 1 wherein said system bus is a Futurebus+.

5. The system of claim 1 wherein said address leads of said local bus, said system bus, and said cache tag carry said address signals in parallel.

6. A bus interface chip, comprising:

interface circuitry coupled to a local bus having address leads carrying address signals, and to a system bus having address leads carrying address signals;

a cache tag for cache operations, said cache tag having address leads carrying address signals; and a universal address generator coupled to said interface circuitry for providing selected address signals on said local bus and said system bus said universal address generator circuitry comprising:

address register circuitry coupled to said local bus, and said system bus for storing said address signals and for providing selected address signals to said local bus and said system bus;

saving circuitry coupled to said address register circuitry for saving address signals first loaded in said address register circuitry;

incrementing circuitry coupled to said saving circuitry for incrementing said saved address signals received from said saving circuitry in accordance with a count input signal; said incrementing circuitry providing said incremented address signal to multiplexing circuitry; and said multiplexing circuitry coupled to and receiving address signals from said local bus, said system bus, said cache tag, and said incrementing circuitry; said multiplexing circuitry selectively loading said address signals into said address register circuitry in response to a select input signal.

7. The bus interface chip of claim 6 wherein said address leads of said local bus, said system bus, and said cache tag carry said address signals in parallel.

8. A method of providing continuous generation of proper addresses on a local bus and a system bus, said local bus and said system bus having address leads carrying address signals, comprising the steps of:

determining, in response to select signals, whether to load the address signals from a cache tag, said local bus, said system bus, or an incrementing multiplexor into an address register;

saving address signals first loaded in said address register;

outputting said address signals to said local bus and said system bus;

incrementing said saved address signals and repeating sequence at said determining step.

9. The method of claim 8 wherein said incrementing step further includes incrementing said address signals according to count signals.

10. The method of claim 8 wherein said system bus is a Futurebus+.

11. The method of claim 8 wherein said address leads of said local bus and said system bus carry said address signals in parallel.

* * * * *